United States Patent
Shako et al.

(10) Patent No.: US 7,466,762 B2
(45) Date of Patent: Dec. 16, 2008

(54) DISTORTION COMPENSATING APPARATUS

(75) Inventors: Hideharu Shako, Yokohama (JP);
Yasuhito Funyu, Kawasaki (JP);
Takeshi Ohba, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 11/107,851

(22) Filed: Apr. 18, 2005

(65) Prior Publication Data

US 2006/0023807 A1  Feb. 2, 2006

(30) Foreign Application Priority Data

Aug. 2, 2004  (JP)  ............... 2004-225546

(51) Int. Cl.
*H04L 25/49* (2006.01)
(52) U.S. Cl. .................................... 375/296
(58) Field of Classification Search ......... 332/123–125, 332/149, 159, 160, 161; 375/295–297; 455/91, 455/114.2, 114.3
See application file for complete search history.

(56) References Cited

U.S. PATENT DOCUMENTS 5,404,378 A * 4/1995 Kimura ...................... 375/296
6,836,517 B2 * 12/2004 Nagatani et al. ............ 375/296
2003/0112891 A1 * 6/2003 Ozaki ........................ 375/296

FOREIGN PATENT DOCUMENTS

| JP | 06-077767   | 3/1994 |
|----|-------------|--------|
| JP | 2001-267850 | 9/2001 |

* cited by examiner

*Primary Examiner*—Tesfaldet Bocure
(74) *Attorney, Agent, or Firm*—Hanify & King, P.C.

(57) ABSTRACT

A distortion compensation apparatus shortens the time until start of the transmission. The distortion compensating apparatus for amplifying the transmitted signal after implementation of the distortion compensation process thereto comprises a coefficient memory operable to store coefficients used for the distortion compensation process, an initial value memory operable to store the initial values of the coefficients, and a controller which controls the coefficient memory to store, with limitation, only the coefficients corresponding to the first portion among those stored in the initial value memory for the initial write to the coefficient memory and to store thereafter the coefficients corresponding to the second portion.

11 Claims, 6 Drawing Sheets

DISTORTION COMPENSATING APPARATUS

CROSS REFERENCE TO RELATED APPLICATION

This application is related to and claims priority to Japanese Application No. 2004-225546 filed Aug. 2, 2004 in the Japanese Patent Office, the contents of which are incorporated by reference herein.

BACKGROUND OF THE INVENTION

1. Field of the Invention

The present invention relates to a distortion compensating apparatus, for example, to a distortion compensating apparatus, which may be suitably adapted to an amplifier for transmission by a radio base station used in the mobile communication system.

2. Description of the Related Art

A radio base station in the mobile communication system is provided with a distortion compensating apparatus to reduce distortion generated in a power amplifier in order to realize large power transmission to mobile stations.

Various systems have been proposed as the distortion compensating system. The predistortion system is an example of such distortion compensating system.

The predistortion system has been proposed to reduce distortion of the signal after amplification thereof by applying an inverse distortion characteristic to the distortion generated in the amplifier to the signal before input to the amplifier.

Here, since distortion generated in the amplifier changes depending on the input signal (particularly, the level of the input signal), it is preferable that the coefficient (distortion compensation coefficient) for applying the inverse distortion characteristic is calculated as a function of the input signal and the input signal is compensated based on this coefficient.

Therefore, a coefficient table (Look-Up Table) for storing the distortion compensation coefficient corresponding to the address generated from the input signal is used in the predistortion system.

The Look-Up Table (LUT) is triggered by activation and reset of the power supply to quickly write the coefficients with an exclusive circuit and to complete the setting of all coefficients before starting the operation.

The predistortion system is disclosed in the Japanese Unexamined Patent Publication No. 2001-267850.

According to the background of the invention described above, coefficients are written at a high speed with an exclusive circuit into the look-up table in the distortion compensating apparatus using the start and reset of power supply as the trigger.

However, precise distortion compensation requires storing of distortion compensation coefficients for small changes of the input signal. As a result, the number of coefficient data to be written increases and a longer time is therefore required until completion of the data writing. Accordingly, a longer time is required until the amplifier can start from the start of operation.

SUMMARY OF THE INVENTION

Therefore, one of the objects of the present invention is to shorten the time required until the start of transmission.

In one embodiment of the present invention, a distortion compensating apparatus for amplifying the transmitted signal after a distortion compensation process thereto comprises a coefficient memory for storing coefficients used for the distortion compensation process, an initial value memory for storing the initial value of the coefficient, and a controller for controlling with limitation the coefficient memory to store, for the initial write to the coefficient memory, only the coefficients corresponding to a first portion among the coefficients stored in the initial value memory and also controlling thereafter the coefficient memory to store the coefficients corresponding to a second portion.

Preferably the coefficients of the first portion correspond to the larger level of the transmitted signal than the coefficients of the second portion.

Preferably the controller controls the second portion after the predetermined period for the initial write.

Preferably the distortion compensating apparatus further comprises a coefficient update unit for updating the coefficients stored in the coefficient memory, wherein the controller allows update of the coefficients corresponding to the first portion stored after storage to the coefficient memory of the coefficients corresponding to the first portion and restricts update at the time of storage to the coefficient memory of the coefficients corresponding to the second portion.

Preferably the distortion compensating apparatus further comprises a restriction unit for performing the distortion compensation process by using limited coefficients corresponding to the first portion after storage to the coefficient memory of the coefficients corresponding to the first portion but before storage of the coefficients corresponding to the second portion.

Preferably the controller cancels restriction after the coefficients corresponding to the second portion are stored to the coefficient memory.

Preferably the coefficients of the first portion correspond to the transmitted signal of a level which is higher than that of the coefficients of the second portion when it is scheduled after the initial write that the transmitted signal is input in a level higher than the predetermined level.

Preferably the coefficients of the first portion correspond to the transmitted signal of the level lower rather than that of the coefficients of the second portion when it is scheduled after the initial write that the transmitted signal is input in a level lower than the predetermined level.

Preferably the distortion compensating apparatus further comprises a distortion detector for detecting distortion of an output signal of the amplifier after storing the coefficient corresponding to the first portion to the coefficient memory, wherein the controller executes the storage control to the coefficient memory of the coefficient corresponding to the second portion in accordance with the result of detection in the distortion detector.

Preferably the second portion includes the coefficients corresponding to the lower level of the transmitted signal than for the first portion and the controller executes the storage control for the coefficients corresponding to the second portion when the distortion detector has detected an amount of distortion which is smaller by the predetermined amount than the amount of distortion which will be assumed to be generated in the amplifier for the input of the transmitted signal level corresponding to the portion when distortion compensation is not performed.

In one embodiment of the present invention, a distortion compensating apparatus for amplifying the transmitted signal after implementing the distortion compensating process, comprises a coefficient memory for storing the coefficients used for the distortion compensating process, an initial value memory for storing the initial value of the coefficient; and a controller for executing the control to store the coefficient corresponding to the second portion to the coefficient memory, while the signal having implemented the distortion compensation process using the coefficient corresponding to the first portion after the coefficient corresponding to the first portion among the coefficients stored in the initial value memory is stored to the coefficient memory.

DETAILED DESCRIPTION OF THE PREFERRED EMBODIMENTS

The preferred embodiments of the present invention will be described with reference to the accompanying drawings.

[a]Description of First Embodiment

In this embodiment, the way of writing data into the look-up table is described.

Distortion Compensating Apparatus

Next, the distortion compensating apparatus of the present invention will be described with reference to FIG. 1.

Figure 1:
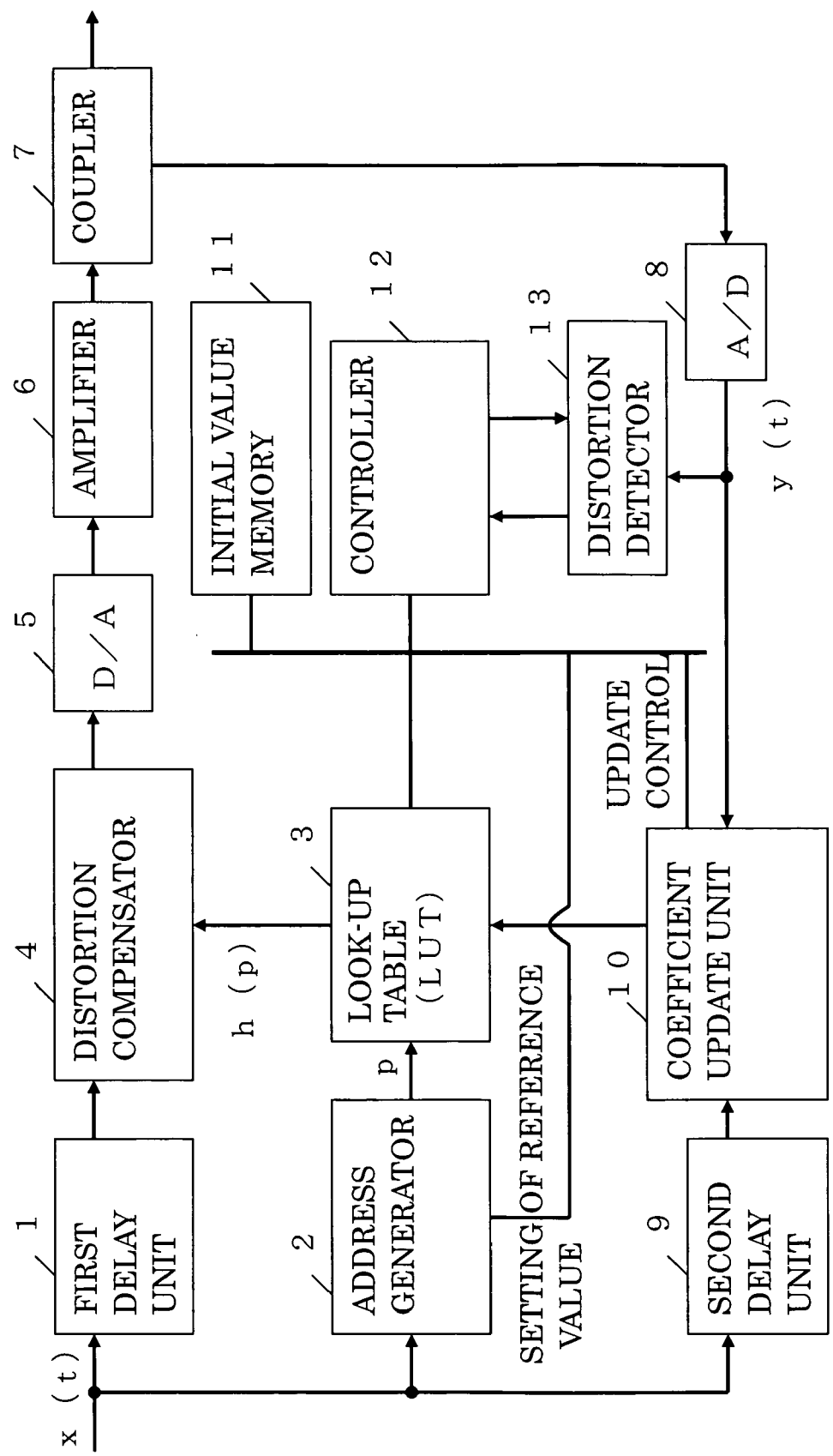
FIG. 1 is a diagram showing the distortion compensating apparatus of the present invention.

FIG. 1 is a diagram illustrating the distortion compensating apparatus of the present invention. This distortion compensation apparatus may also be used as the amplifying unit for transmission of the radio base station in the mobile communication system. Of course, the present invention can also be adapted to an ordinary radio communication apparatus in addition to mobile communication.

In this FIGURE, numeral 1 designates a first delay unit for giving the predetermined delay to the input signal; 2, an address generator for outputting addresses for storing the distortion compensation coefficient used for the distortion compensation process; 3, a look-up table (LUT) (coefficient memory) for storing the distortion compensation coefficient used for the distortion compensation process; 4, a distortion compensator for predistortion using the distortion compensation coefficient; 5, a D/A converter; 6, an amplifier as the object of distortion compensation; 7, a coupler for extracting a part of the amplified signal as the feedback signal; 8, an A/D converter; 9, a second delay unit for giving the predetermined delay; 10, a coefficient updating unit for updating the coefficients stored in the coefficient memory 3; 11, an initial value memory for storing the distortion compensation coefficient as the object for storing into the coefficient memory 3; 12, a controller for controlling each block (for example, a general purpose processor may also be used); and 13, a distortion detector for detecting the amount of distortion included in the feedback signal and then indicating the distortion amount to the controller 12.

Operations of Distortion Compensating Apparatus

The transmitted signal, x(t), input to the distortion compensating apparatus is delayed by the predetermined amount of delay in the first delay unit 1 and is then input to the distortion compensator 4. Here, the predetermined delay is provided to allow the time required for outputting the distortion compensation coefficient h(p) from the coefficient memory 3 on the basis of x(t) as the transmitted signal.

Namely, x(t) is input to the address generator 2 and the address p is output in accordance with the level of x(t).

The coefficient memory 3 reads the distortion compensation coefficient stored in the address thereof and gives it to the distortion compensator 4 as h(p).

The distortion compensation processor 4 applies the predistortion to the transmitted signal x(t) by providing an inverse distortion characteristic to the distortion characteristic of the amplifier using the distortion compensation coefficient h(p) from the coefficient memory 3.

Namely, when the distortion characteristic of amplifier 6 is defined as F(p) and the linear amplifying coefficient, as G, the linear amplification of the transmitted signal can be expressed as $$y(t)=F(p) \times h(p) \times x(t)=G \cdot x(t)$$

by multiplying h(p) by the transmitted signal x(t) in order to result in h(p)×F(p)=G.

The transmitted signal having completed the distortion compensation process in the distortion compensator 4 is converted to an analog signal in the D/A converter 5 and is then amplified by the amplifier 6.

Here, the higher the level of transmitted signal, the more the amount of distortion generated in the amplifier 6 increases, but the output thereof becomes more linear since distortion of the inverse characteristic is previously given in the distortion compensation processor 4.

The amplified signal from the amplifier 6 is output as the transmitted signal but a part of this signal is extracted with the coupler 7 for use as the feedback signal.

Namely, the feedback signal is converted to a digital signal by the A/D converter 8 and is then applied to the coefficient update unit 10.

The update unit 10 receives simultaneously the transmitted signal x(t) and the signal attained by delaying the signal x(t) in the second delay unit 9 and updates the coefficient in the coefficient memory 3 by comparing these two input signals.

Namely, if deviation is generated in the distortion compensation coefficient in the coefficient memory 3, when the distortion compensation coefficient to be updated is defined as h'(p), it can be obtained from $$h'(p)=G \div F(p)=G \cdot x(t) \cdot h(p) \div y(t).$$

Therefore, the update may be realized by storing h'(p) in place of the corresponding h(p). As described above, the distortion compensating and amplifying apparatus illustrated in FIG. 1 can perform the predistortion using the feedback signal while the distortion compensation coeffcient is updated.

Initial Write to Coefficient Memory 3

Next, a procedure for initial write to the coefficient memory 3 will be described.

For the distortion compensation process, it is required to previously store the distortion compensation coefficient to the coefficient memory 3 in accordance with the level of transmitted signal.

However, it is impossible or not desirable to use stored contents of the coefficient memory 3 when the radio base station including this distortion compensation apparatus is activated or when the distortion compensation and amplifying unit is reset.

Accordingly, in this case, the control (initial write) is required to read the distortion compensation coefficient from the initial value memory 11 and store the distortion compensation coefficient to the coefficient memory 3.

However, when it is attempted to execute more precise distortion compensation, a problem arises in that the amount of data of the coefficient data so greatly increases as described above and the time required for storage control to the coefficient memory 3 becomes longer.

Therefore, in this embodiment, the coefficients stored in the initial value memory are divided into a first part and a second part (of course, it may be divided into three or more parts). The controller 12 executes the control to restrict first the write operation only to the first part for the first write and then to execute the subsequent write operation on the second part.

Accordingly, the amount of data of the distortion compensation coefficient to perform the initial write is restricted when the radio base station including this distortion compensating and amplifying apparatus is activated or when this distortion compensating and amplifying unit is reset. Therefore, the time required until start of transmission can be shortened because the initial write can be completed quickly, transmission of the amplified signal output from the relevant distortion compensating and amplifying apparatus is started, and thereafter the remaining distortion compensation coefficients are written adequately.

Consideration for Write Sequence

Moreover, it is useful to consider the write sequence of the distortion compensation coefficients.

Namely, as described previously, the amount of distortion generated in the amplifier increases as the transmitted signal becomes larger and therefore it must be suppressed to a larger extent.

Therefore, in this embodiment, the first part for the initial write is defined as the distortion compensation coefficients corresponding to the transmitted signal at higher levels (preferably, the distortion compensation coefficient corresponding to the predetermined level range including the maximum transmission level which may be possibly input as the transmitted signal) and the second part for the subsequent write is defined as the distortion compensation coefficients corresponding to the transmitted signal at lower levels than the first part.

This control may be realized by the controller 12 when it discriminates, as the first part and second part, the data which is read from the initial value memory 11 and is stored to the coefficient memory 3.

Because of the consideration described above, the data which is set first to the coefficient memory 11 becomes the distortion compensation coefficient when the transmitted signal has a comparatively higher level. Accordingly, this can prevent the generated distortion from becoming too large even if transmission is started before storing of all the distortion compensation coefficients is completed.

Moreover, the second part can be written when the controller 12 has detected that the predetermined time has passed from the initial write of the first part.

If the second or other part exists, it can, of course, be written sequentially to the coefficient memory 3 each time when the predetermined period has passed in the sequence of the level of transmitted signal.

Preferably, the distortion coefficient of the first part is executed by the coefficient update unit 10 during the period until the write of the second part after the initial write of the first part.

The reason is that the optimization process of the distortion compensation coefficients of the transmitted signal having larger level can be executed by effectively utilizing the time until the second part.

It is preferable for the controller 12 to allow update of the coefficient by transmitting the control signal to the coefficient update unit 10. For the write of the second part, it is preferable for the controller 12 to give the control signal for regulating the update to the coefficient update unit 10 so that the write operation is never conducted simultaneously in the coefficient memory 3.

Figure 2:
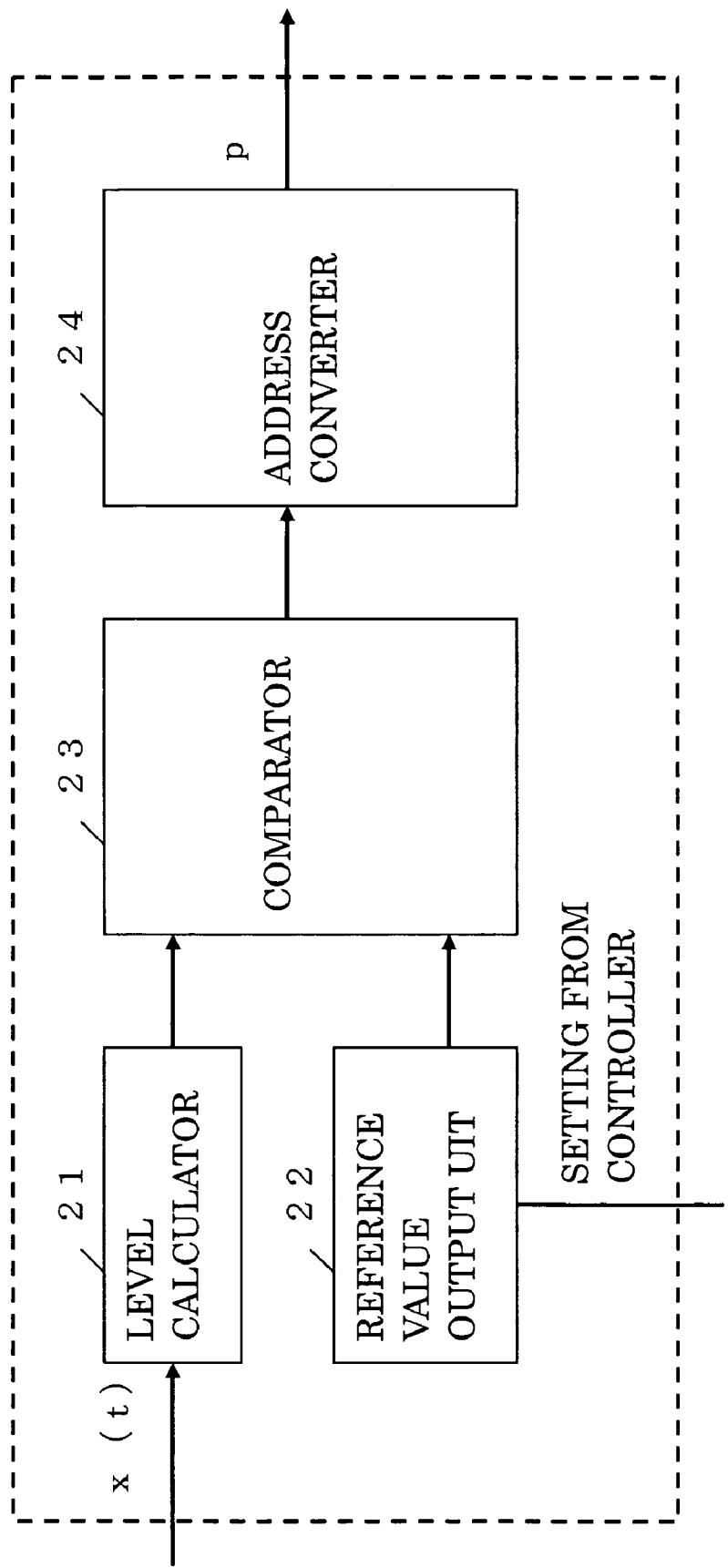
FIG. 2 is a diagram showing details of the address generator in the present invention.

Consideration until all distortion compensation coefficients are stored after the initial write FIG. 2 is a diagram showing a structure of the address generator 2 as the controller.

In this FIGURE, numeral 21 designates a level calculator for calculating the level of the transmitted signal $x(t)$; 22, a reference value output unit for outputting the reference value designated from the controller 12; 23, a comparator for comparing the level from the level calculator 21 with the reference value to selectively output the larger value (when these are identical, the level calculator 21 is selected); 24, an address converter for outputting the signal from the comparator 23 after conversion into address information.

When the address that is converted based on the level of the transmitted signal $x(t)$ indicates the storing area of the second part under the condition that the coefficient of the first part is stored into the coefficient memory 3 but the coefficient of the second part is not yet stored, it is defined as an error.

Therefore, in this embodiment, the controller 12 sets a minimum transmitting level among the transmitting levels for which compensation coefficients are already written by the initial write, as the reference value to the reference value output unit 22 until the end of the initial write.

Accordingly, when the transmitted signal $x(t)$ input after the initial write is larger than the reference value, it is selected by the comparator 23, the address of the storing area corresponding to the first part is output by the address converter 24, and an adequate distortion compensation coefficient can be read.

When the transmitted signal $x(t)$ input after the initial write is smaller than the reference value, the reference value is selected by the comparator 23, and the distortion compensation coefficient in the first part corresponding to the minimum transmitting level is output by the address converter 24.

As described above, the distortion compensation coefficient is output even when a transmitted signal corresponding to the part not yet completed in the write operation is input.

As an alternate process, it is also possible to store a specified value which does not change $x(t)$ as the distortion compensation coefficient, and to set a level which is lower by one step than the minimum value among those levels already written to the coefficient memory 3 to the reference value output unit 22 as the reference value. And the address converter 24 converts the reference value to an address corresponding to the storing area of the specified value not to change $x(t)$.

Accordingly, the possibility for inadequate distortion compensation may be lowered by discarding implementation of the distortion compensation process for the transmitted signal, for which distortion compensation coefficients are not yet written.

As described above, the controller 12 can limit the distortion compensation coefficient used for the distortion compensation process only to the first part by controlling the reference value. However, when the second part has completed the write process to the coefficient memory 3, it is preferable that the second part may also be used as the distortion compensation coefficient by lowering the reference value.

Multistage Write

In above example, the write process in two stages has been described but the multistage write process will also be described with reference to FIG. 3 to FIG. 5.

Figure 3:
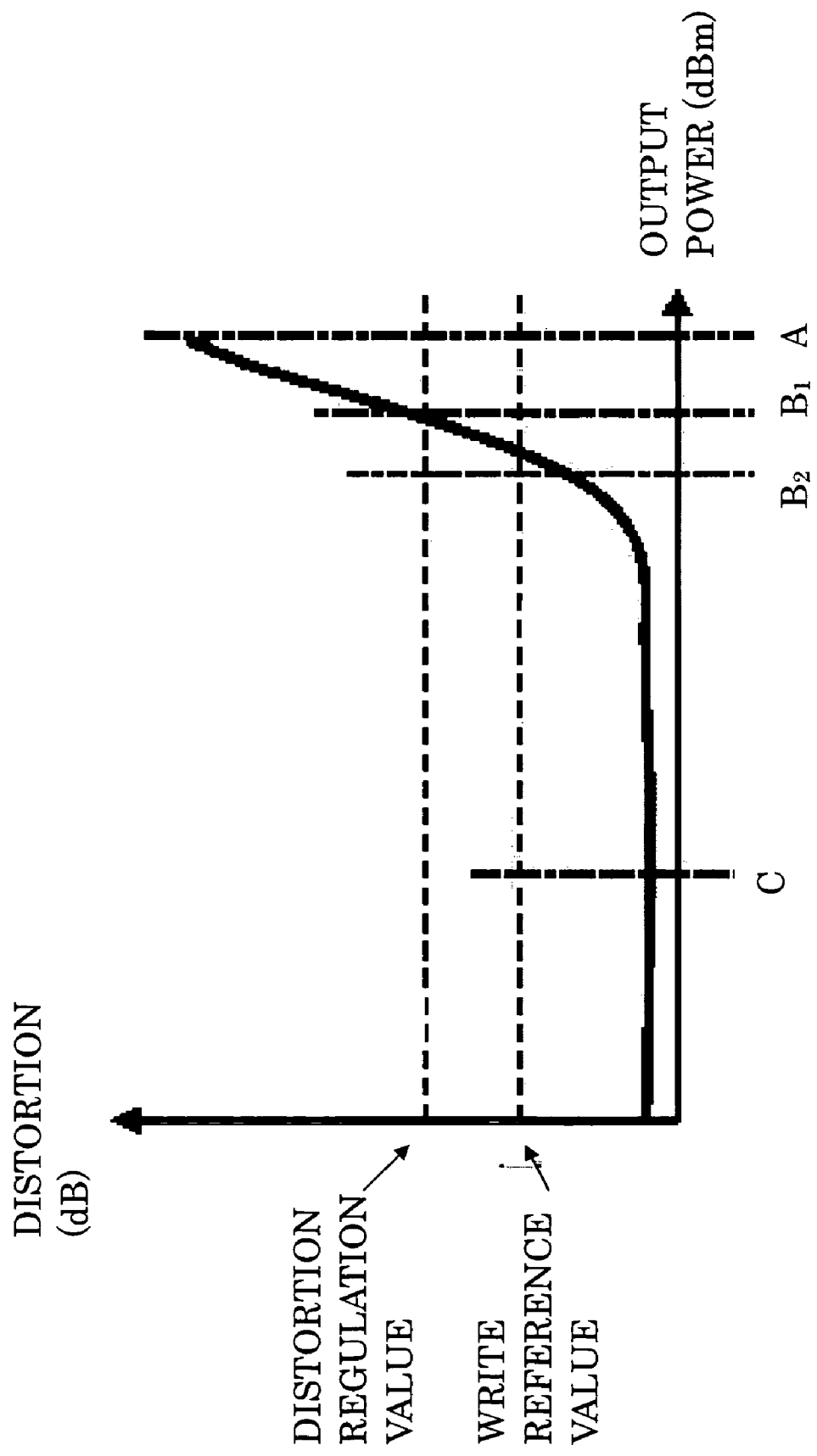
FIG. 3 is a diagram showing the distortion curve in an amplifier.

FIG. 3 is a diagram showing the distortion curve in the amplifier.

As described previously, the larger an output power (input signal) of the amplifier is, the more distortion increases.

The distortion regulation value indicates the maximum amount of distortion generated which is allowed by the distortion compensating and amplifying apparatus. Namely, the distortion compensation amplifier is basically required to suppress the distortion exceeding this distortion regulation value.

While the output power is in the range of A to B1, the distortion is exceeding the distortion regulation value when the distortion compensation process is not conducted. When the output power is in the ranges of B2 to B1, and C to B2, the distortion is lower than the distortion regulation value even when the distortion compensation process is not conducted.

Figure 4:
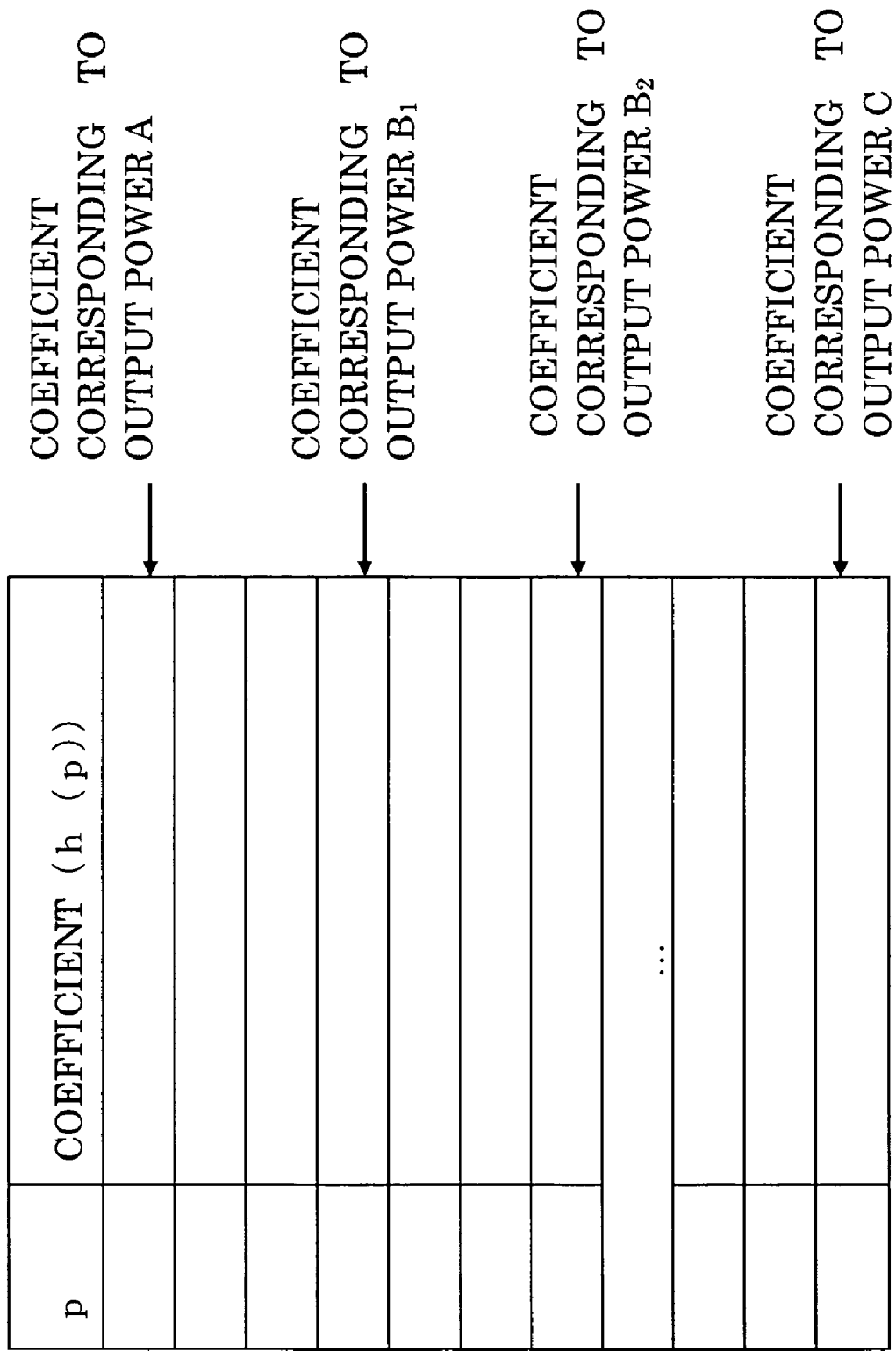
FIG. 4 is a diagram showing storage contents of a coefficient memory (Look-Up Table (LUT)).

Accordingly, in this case, it is desirable that the coefficients in the output power range of A to B1 are written first as the initial write to the coefficient memory 3 (LUT), next the coefficients in the output power range of B1 to B2 are written, and finally the coefficients in the output power range of B2 to C are written, as illustrated in FIG. 4.

Figure 5:
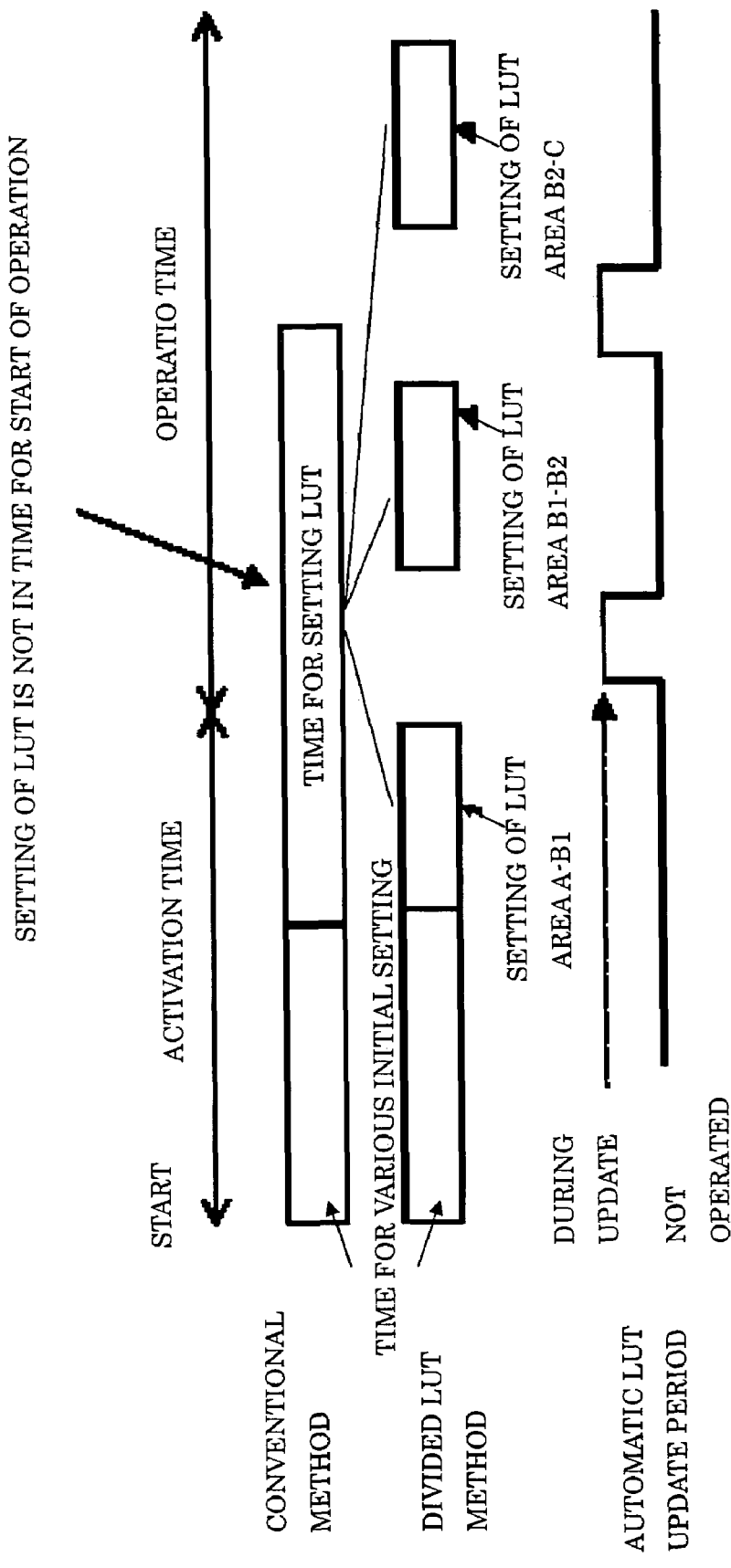
FIG. 5 is a diagram showing the LUT setting method.

Such writing processes are indicated in FIG. 5 in the form of time series. Various settings are "started" (triggered) with activation of the radio base station including this distortion compensating and amplifying apparatus and reset of the distortion compensating and amplifying unit. After the predetermined activation time, the operating time to start the transmission occurs. However, according to the method described in the background of the invention, it can be understood that setting of the coefficient memory 3 (LUT) is not yet completed as illustrated in FIG. 5 because a large number of data exists for the distortion compensation coefficient even when the operating time to start the transmission occurs.

Meanwhile, when the multistage write process (LUT dividing system) is employed as in the case of this embodiment, setting of the distortion compensation coefficients for the input signal which probably exceeds the distortion regulation value is completed within the activation time, as illustrated in the FIGURE, and generation of distortion exceeding the distortion regulation value can be suppressed even when the transmission is started because of start of operation.

Thereafter, as described previously, update for the coefficients in the output power range of A to B1 in the coefficient memory 3 (LUT) is executed and when the update is suspended, write of the distortion compensation coefficients in the output power range of B1 to B2 into the coefficient memory 3 is executed.

Update for the output power range of B1 to B2 and write for the output power range of B2 to C are also performed subsequently in the same manner as described above.

In this embodiment, while the multistage write is conducted and generation of distortion exceeding the distortion regulation value is prevented, quick start of transmission can be realized in this embodiment as described above.

Initial write control in accordance with a kind of activation and reset

In this embodiment, consideration is taken for large differences in the level of the transmitted signal input after the initial setting when the radio base station including this distortion compensating and amplifying apparatus is activated and when only the distortion compensating and amplifying unit is reset.

Figure 6:
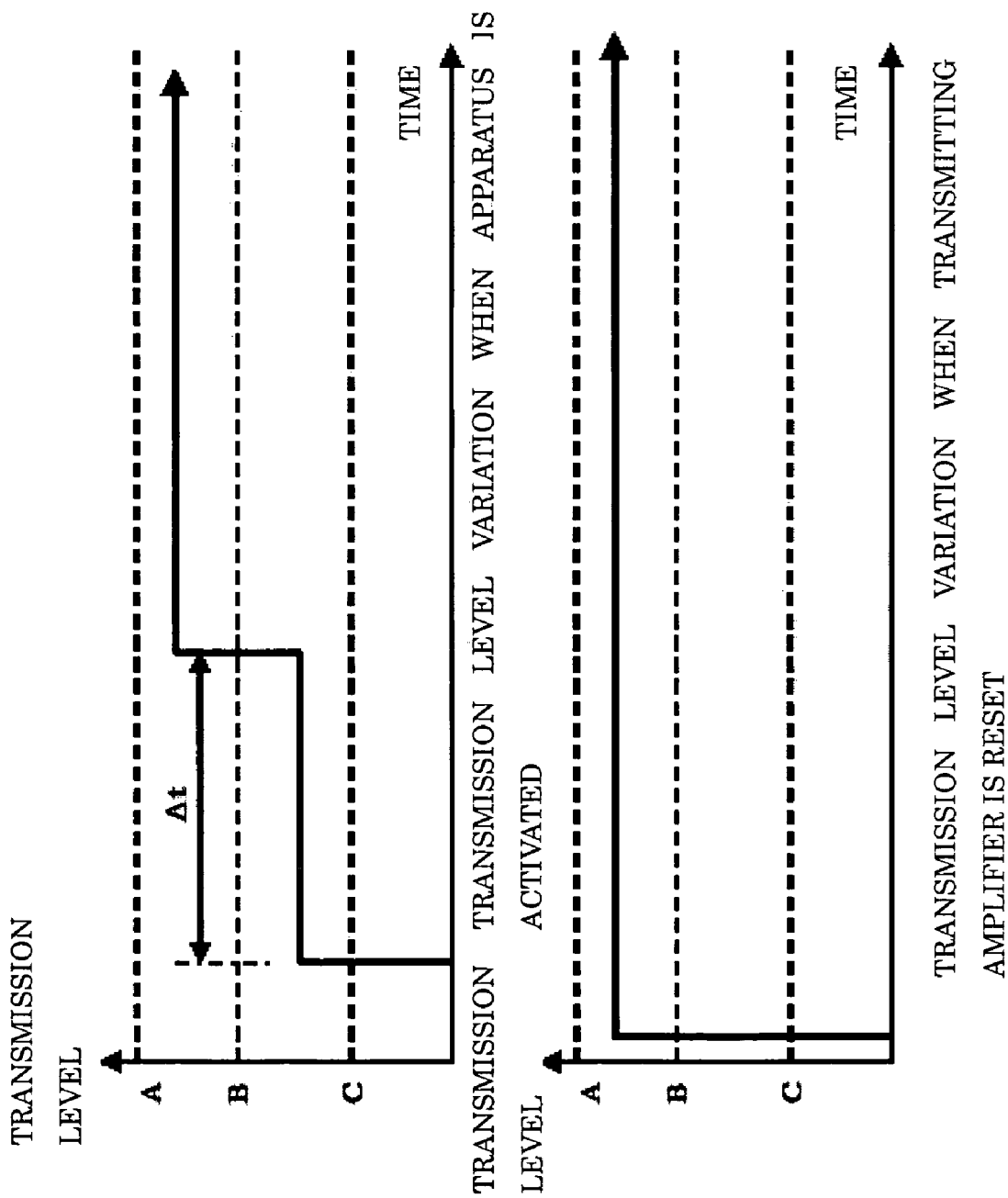
FIG. 6 is a diagram showing the write area for activation of the apparatus and reset of the transmitting amplifier.

Namely, when the radio base station including this distortion compensating and amplifying apparatus is activated, as will be apparent from the upper diagram of FIG. 6, the level of the transmitted signal gradually increases from 0 even when the operation is started upon completion of the initial setting. In addition, an allowance of as much as the time indicated by $\Delta t$ is still left, in certain cases, until the level of transmitted signal rises up to the level resulting in the possibility that the transmitted signal exceeds the distortion regulation value of FIG. 3.

Unlike the case where the transmission is once suspended and is immediately started again, a small mount of signal is transmitted first and level of the transmitted signal is also increased gradually.

Accordingly, when it is scheduled that the transmitted signal is input for the predetermined period under the predetermined level (a certain level criterion which is assumed, for example, to reach the distortion regulation value) as described above, it is desirable that the distortion compensation coefficients corresponding to the output power range of B1 to B2 or B2 to C in FIG. 3 are assumed as the object of the initial write and the write of coefficients corresponding to the output power range of A to B1 is completed until the predetermined time ($\Delta t$) has passed.

Accordingly, distortion during the period of $\Delta t$ can be suppressed effectively by utilizing the distortion compensation coefficients corresponding to the output power range of B1 to B2 or B2 to C. Moreover, even when the transmitted signal level becomes high, distortion can be suppressed effectively with utilization of the distortion compensation coefficients of the output power range of A to B1.

On the other hand, when only the distortion compensating and amplifying unit is reset, as is apparent from the lower diagram of FIG. 6, a high level transmitted signal which possibly exceeds the distortion regulation value is input immediately after completion of the initial setting.

In this case, since transmission being suspended is immediately started, a large amount of signals are transmitted and the transmitted signal level is high from the beginning.

Therefore, as described above, when it is scheduled that the transmitted signal higher than the predetermined level (for example, level criterion resulting in the possibility to reach the distortion regulation value) is input for the predetermined period, it is desirable that the distortion compensation coefficients corresponding to the output power range of A to B1 in FIG. 3 are considered as the object of initial write and thereafter the distortion compensation coefficients corresponding to the output power range of B1 to B2 or B2 to C are written in step by step.

Preferably, the controller 12 discriminates, as the different modes, the cases when the radio base station mounting this distortion compensating and amplifying apparatus is activated and only the distortion compensating and amplifying unit is reset and selectively executes the corresponding initial write control in accordance with the mode discriminated.

[b]Description of the Second Embodiment

In this embodiment, the write timing of the distortion compensation coefficient for the second part is controlled in the first embodiment.

In FIG. 1, the distortion detector 13 is illustrated and this distortion detector 13 detects the distortion of the feedback signal which has been extracted by the coupler 7 and is converted to a digital signal by the A/D converter 8.

The controller 12 executes the write control for the second part in accordance with the amount of distortion detected by the distortion detector 13.

Namely, the distortion detector 13 implements the FFT process, for example, to the digital feedback signal, detects the level of the distortion element existing outside of the bandwidth of the transmitted signal, and notifies the detection result to the controller 12.

The controller 12 compares the written criterion, which is the amount of distortion which is smaller by the predetermined value, for example, than the distortion regulation value of FIG. 3 with the indicated amount of distortion. When the indicated amount of distortion exceeds the written criterion, the controller 12 immediately stops the update process for the first part (distortion compensation coefficient corresponding to the output power range of A to B1 or the like) and executes the write control for the second part (distortion compensation coefficient corresponding to the output power range of B1 to B2).

The reason is that amount of distortion to be transmitted can be set to the smaller value when the distortion compensation coefficient is written with higher priority, although the distortion does not reach the distortion regulation value, than that of improvement in accuracy of the distortion compensation due to the update of the distortion compensation coefficient.

In the first and second embodiments, the second part is set at least after the predetermined time has passed for the first part. However, the second part is not always set after the predetermined time has passed. Namely, it is also possible that the second part can be continuously written into the coefficient memory 3 (LUT), while the signal having completed the distortion compensation process using the distortion compensation coefficient corresponding to the first part is transmitted after the setting of the first part.

Preferably, in this case the controller 12 controls the coefficient update unit 10 not to update the first part during the write process of the second part.

The distortion compensating apparatus of the present invention is capable of shortening the time required until start of the transmission.

What is claimed is:

1. A distortion compensating apparatus for amplifying and transmitting a signal after a distortion compensation process is performed thereto, comprising:
   a coefficient memory configured to store coefficients used for the distortion compensation process;
   an initial value memory configured to store initial values of the coefficients; and
   a controller configured to control, the coefficient memory to store, for an initial write to the coefficient memory, only coefficients corresponding to a first portion of coefficients stored in the initial value memory and also controlling thereafter the coefficient memory to store coefficients corresponding to a second portion of coefficients stored in the initial value memory.

2. The distortion compensating apparatus according to claim 1, wherein the coefficients of the first portion correspond to a larger level of the transmitted signal than the coefficients of the second portion.

3. The distortion compensating apparatus according to claim 1, wherein the controller controls the second portion after a predetermined period for an initial write.

4. The distortion compensating apparatus according to claim 1, further comprising a coefficient update unit operable to update the coefficients stored in the coefficient memory, wherein
   the controller allows update of the coefficients corresponding to the first portion stored after storage to the coefficient memory of the coefficients corresponding to the first portion and restricts update at the time of storage to the coefficient memory of the coefficients corresponding to the second portion.

5. The distortion compensating apparatus according to claim 1, further comprising a restriction unit operable to restrict the coefficients used for the distortion compensation process to those corresponding to the first portion after storage to the coefficient memory of the coefficients corresponding to the first portion but before storage of the coefficients corresponding to the second portion.

6. The distortion compensating apparatus according to claim 5, wherein the controller cancels the restriction after the coefficients corresponding to the second portion are stored to the coefficient memory.

7. The distortion compensating apparatus according to claim 1, wherein the coefficients of the first portion correspond to the transmitted signal of the level which is higher than that of the coefficients of the second portion when it is scheduled after the initial write that the transmitted signal is input in the level higher than the predetermined level.

8. The distortion compensating apparatus according to claim 1, wherein the coefficients of first portion correspond to the transmitted signal of a level lower than that of the coefficients of the second portion when it is scheduled after the initial write that the transmitted signal is input in the level lower than the predetermined level.

9. The distortion compensating apparatus according to claim 1, comprising a distortion detector operable to detect distortion of an output signal of the amplifier after storing of the coefficients corresponding to the first portion to the coefficient memory, wherein the controller executes the storage control to the coefficient memory of the coefficients corresponding to the second portion in accordance with the result of detection in the distortion detector.

10. A distortion compensating apparatus according to claim 9, wherein the second portion includes the coefficients corresponding to the lower level of the transmitted signal than the first portion and the controller executes the storage control for the coefficients corresponding to the second portion when the distortion detector has detected an amount of distortion which is smaller by a predetermined amount than the amount of distortion which will be assumed to be generated in the amplifier for the input of the transmitted signal level corresponding to the portion when distortion compensation is not performed.

11. A distortion compensating apparatus for amplifying and transmitting a signal after performing a distortion compensating process, comprising:
   a coefficient memory configured to store coefficients used for the distortion compensating process;
   an initial value memory configured to store initial values of the coefficients; and
   a controller configured to control the coefficient memory to store a first portion of the initial values of the coefficients and thereafter to store a second portion of the initial values of the coefficients while the distortion compensating process is performed on a signal using the first portion of the initial values of the coefficients.

* * * * *